Patented June 21, 1932

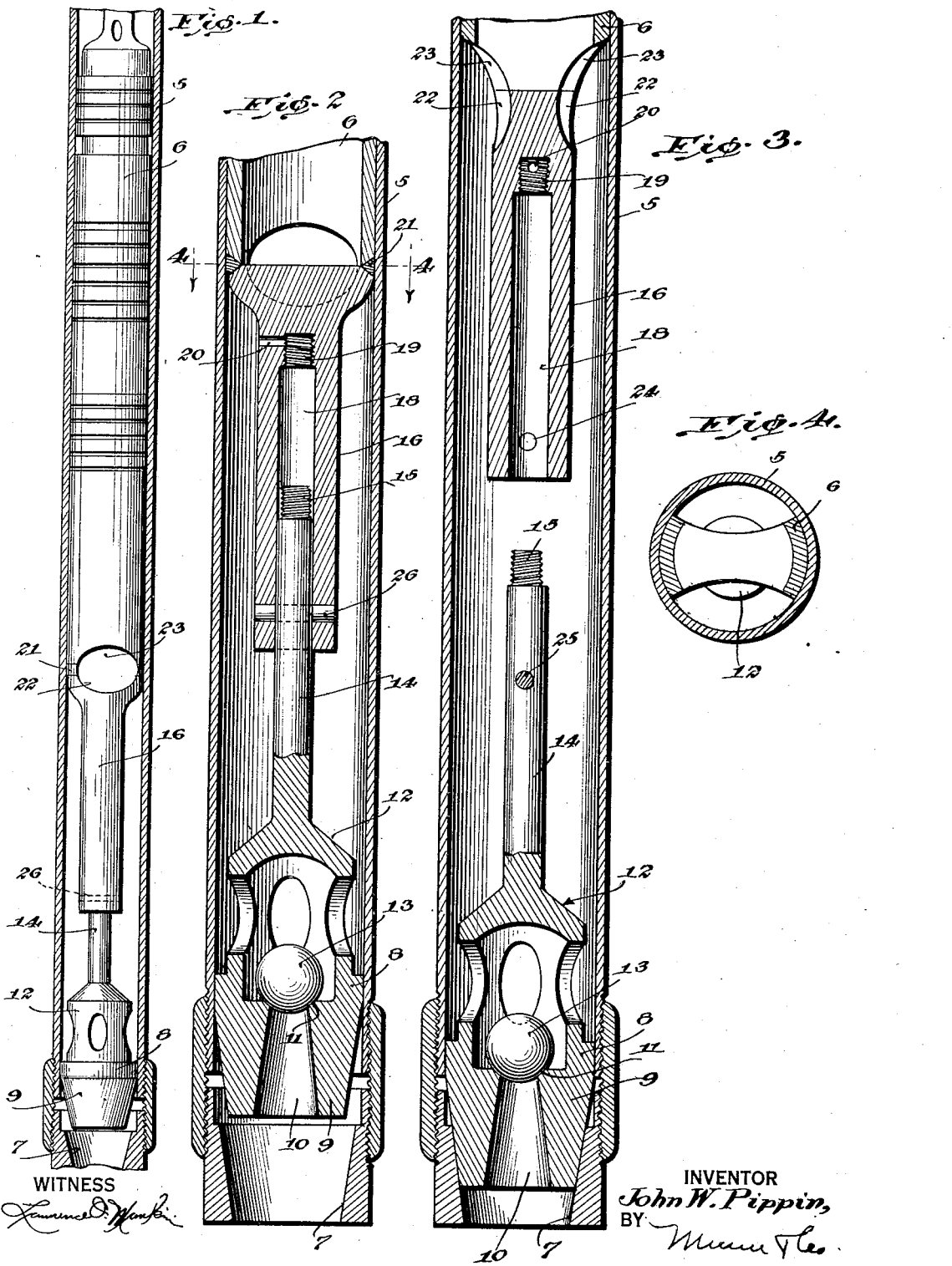

1,864,469

UNITED STATES PATENT OFFICE

JOHN W. PIPPIN, OF CORPUS CHRISTI, TEXAS

PUMP PLUNGER AND STANDING VALVE

Application filed January 3, 1931. Serial No. 506,471.

My invention relates to pumps and particularly to pump plungers and standing valves for oil wells and to fishing tools therefor.

It is an object of the invention to provide a standing valve which may be lowered into the well with the pump plunger and which will be automatically released therefrom when the valve strikes its seat at the lower end of the working barrel.

Another object of the invention is to provide a well plunger which is equipped with a fishing tool to pick the standing valve up and draw it from the well with the pump when this is desired.

A still further object of the invention is to provide a cushioning means between the standing valve and fishing tool which will cushion the impact when the two approach cooperative position when it is desired to lift the valve or during the operation of the pump.

Other important objects not specifically mentioned will become apparent during the course of the following detailed description when read in conjunction with the accompanying drawing, which forms a part of this specification and in which;

Figure 1 is a side elevation of a standing valve and fishing tool constructed according to my invention and showing the same being lowered into a well;

Fig. 2 is a central vertical section of a portion of Fig. 1 and showing my valve and fishing tool in detail as they are being lowered into the well;

Fig. 3 is a central vertical section taken at right angles to Fig. 2 and showing the valve seated and the fishing tool separated therefrom, and Fig. 4 is a horizontal section taken on the line 4—4 of Fig. 2.

Referring now to the drawing in detail and in which like numerals refer to like parts throughout the several views, 5 indicates the working barrel of a well casing in which a pump plunger 6 is adapted to be reciprocated by means of a conventional rigging (not shown).

The lower end of the working barrel is provided with the usual seat 7 for the reception of a standing valve 8. The standing valve 8 is composed of a main body 9 having a vertical bore 10 extending therethrough and having a valve seat 11 formed at the upper end thereof. A ball cage 12 is formed with the body 9 and houses a ball check 13 which is adapted to rest upon the seat 11 and check the flow of fluid from the working barrel during the downstroke of the pump 6 as will be readily understood.

An upstanding shank or stem 14 is mounted upon and extends a considerable distance above the ball cage 12. This shank 14 is disposed centrally of the working barrel and is preferably formed as a unit with the cage and valve body. The shank 14 is preferably substantially circular in cross section and has the upper end thereof slightly reduced in diameter as at 15 and provided with screw threads for a purpose to be presently described.

A depending socket 16 is carried by the lower end of the pump plunger 6. The socket 16 is preferably circular in cross section and is much smaller in external diameter than the internal diameter of the working barrel 5 so that oil can flow upwardly past the socket without being unduly obstructed thereby. The socket 16 is supported centrally of the working barrel and is constructed with a downwardly opening central bore 18 adapted at stated times to receive the upstanding shank or stem 14. The upper closed end of the bore 18 is reduced in diameter as at 19 and is internally screw threaded for threaded connection with the reduced end 15 of the rod 14.

A bleed port 20 extends transversely from the upper end of the reduced end 19 and communicates with the interior of the working barrel. This bleed port 20 provides a retarded exit for the oil in the socket when the socket is lowered over the stem 14 and provides a cushioning effect for the weight and force of the pump plunger and rigging so as to prevent injury to the screw threads on the stem and in the socket.

The socket 16 is secured to the lower open end of the pump plunger 6 by welding 21 and is cut away on opposite sides as at 22. The cut away portions 22 cooperate with cut away portions 23 at the lower tubular end of the pump plunger 6 so as to provide large openings for the passage of oil into the pump plunger. This constructions presents very little obstruction to the free flow of oil and also produces a strong and efficient structure.

For the purpose of supporting the standing valve while lowering the same into the well, the socket 16 is provided with a transversely extending bore 24 near the lower end thereof. The rod 14 is provided, adjacent its upper end, with a similar bore 25 adapted to be brought into register with the bore 24 when the rod 14 is partially inserted into the socket 16. A wooden pin 26 is driven into the registering bores 24 and 25 to temporarily suspend the standing valve from the socket.

In operation, with the standing valve locked to the socket 16 as shown in Figs. 1 and 2, the pump is lowered into the well. When the standing valve hits bottom and strikes its seat 7, the weight of the pump plunger and pump rods will sever the wooden pin 26 as will be clearly understood, whereupon the plunger may be raised, leaving the standing valve in place.

During the usual operation of the pump, the socket 16 would not ordinarily approach within striking distance of the upstanding stem 14 of the standing valve. However, if this condition does obtain due expansion or "stretching" of the pull rods or from other causes, the rod 14 entering the bore 18 will compress the liquid therein and produce a dash pot action thus cushioning the downward force of the pump plunger and socket and preventing injury to the threads at 15 and 19. This action will also prevent injury to the standing valve due to the pump plunger "striking bottom."

When it is desired to remove the standing valve from the well, the plunger is lowered until the stem 14 is received within the socket 16, whereupon the plunger and socket are rotated to threadedly connect the end 15 within the socket 19. When this operation is completed, the pump is drawn from the well together with the standing valve.

Although the socket 16 has been shown and described as being carried by the lower end of a pump plunger, it will be understood that the same may be used in connection with other valve "fishing" equipment and it will be also understood that although a preferred embodiment has been shown and described, various changes in the details of construction and operation may be made without departing from the spirit of the invention as defined by the appended claims.

I claim:

1. In a well fishing tool, a body, a socket depending therefrom and having a downwardly opening bore closed at its upper end, said bore being reduced at its upper end and provided with screw threads, a standing valve, an upstanding stem formed thereon and having a reduced upper end provided with screw threads, said stem being formed to fit said bore, said socket being provided with a bleed port communicating with the upper end of said bore whereby to slowly relieve the fluid pressure in said bore incident to the entrance of said stem therein, said threaded end of said stem being adapted to be engaged in the reduced threaded end of said bore when it is desired to lift said valve from its seat.

2. In a device of the character described, a standing valve having an upstanding stem thereon, a body, a socket depending therefrom having a bore closed at its upper end and opening downwardly whereby to receive said stem when said body is lowered, said socket having a bleed port communicating with the upper end of said bore to slowly relieve the pressure in said bore incident to the entrance of the stem therein whereby to cushion the lowering movement of said body, and means in said socket for engaging said stem.

3. In a device of the character described, a body, a socket depending therefrom, a standing valve having an upstanding stem to be received in said socket, a fragile connection securing said stem within said socket whereby to support said valve from said body while being lowered into a well.

4. In a device of the character described, a body, a socket depending therefrom having a transverse bore adjacent the lower end thereof, a standing valve, an upstanding stem on said valve having a transverse bore adapted to register with the bore in said socket when said stem is partially inserted into said socket, and a wooden pin received in said registering bores whereby to support said valve from said socket while being lowered into a well.

5. In a device of the character described, a well plunger, a socket depending therefrom having a transverse bore adjacent the lower end thereof, a standing valve, an upstanding stem on said valve having a transverse bore adapted to register with the bore in said socket when said stem is partially inserted into said socket, and a wooden pin received in said registering bores whereby to support said valve from said socket while being lowered into a well, the weight of said plunger serving to sever said pin on either side of said stem when said valve reaches its seat at the bottom of the well.

JOHN W. PIPPIN.